(12) United States Patent
Duan et al.

(10) Patent No.: US 11,003,625 B2
(45) Date of Patent: May 11, 2021

(54) METHOD AND APPARATUS FOR OPERATING ON FILE

(71) Applicant: Baidu Online Network Technology (Beijing) Co., Ltd., Beijing (CN)

(72) Inventors: Lian Duan, Beijing (CN); Hua Zhou, Beijing (CN); Qingxing Wang, Beijing (CN); Guohua Zhang, Beijing (CN); Hao Su, Beijing (CN); Haijun Pan, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 39 days.

(21) Appl. No.: 15/564,165

(22) PCT Filed: Jun. 17, 2016

(86) PCT No.: PCT/CN2016/086216
§ 371 (c)(1),
(2) Date: Oct. 3, 2017

(87) PCT Pub. No.: WO2017/107414
PCT Pub. Date: Jun. 29, 2017

(65) Prior Publication Data
US 2018/0285376 A1 Oct. 4, 2018

(30) Foreign Application Priority Data

Dec. 25, 2015 (CN) .......................... 201510993999.9

(51) Int. Cl.
*G06F 16/00* (2019.01)
*G06F 16/13* (2019.01)
(Continued)

(52) U.S. Cl.
CPC ........ *G06F 16/137* (2019.01); *G06F 11/1435* (2013.01); *G06F 16/13* (2019.01);
(Continued)

(58) Field of Classification Search
CPC ............. G06F 16/9014; G06F 16/2255; G06F 16/137; G06F 16/10; G06F 16/41;
(Continued)

(56) References Cited

U.S. PATENT DOCUMENTS 6,304,601 B1 * 10/2001 Davison .................. H03M 7/42
341/106
6,324,637 B1 * 11/2001 Hamilton ............ G06F 16/9014
711/216
(Continued)

FOREIGN PATENT DOCUMENTS

CN         1818887          8/2006
CN       101901263 A       12/2010
(Continued)

OTHER PUBLICATIONS

International Search Report in PCT/CN2016/086216 dated Aug. 25, 2016 in 2 pages.
(Continued)

*Primary Examiner* — Srirama Channavajjala
(74) *Attorney, Agent, or Firm* — Knobbe, Martens, Olson & Bear LLP

(57) ABSTRACT

The present disclosure discloses a method and apparatus for operating on a file. A specific embodiment of the method comprises: receiving a request of an operation on a target file, acquiring index information associated with a storage space address of a data page based on a file name and a data page identifier, the index information being stored in an on-chip memory of a processor for executing a machine instruction corresponding to the operation; and finding the data page based on the index information, and performing the operation on the data page. Accordingly, the operation on the file is implemented depending on an index stored in the on-chip memory, so that memory overheads of accessing the
(Continued)

index are equivalent to 0, and memory resources are saved, thereby reducing system overheads.

13 Claims, 11 Drawing Sheets

(51) Int. Cl.
*G06F 16/182* (2019.01)
*G06F 16/18* (2019.01)
*G06F 16/51* (2019.01)
*G06F 16/22* (2019.01)
*G06F 16/901* (2019.01)
*G06F 11/14* (2006.01)

(52) U.S. Cl.
CPC ........ *G06F 16/182* (2019.01); *G06F 16/1847* (2019.01); *G06F 16/2255* (2019.01); *G06F 16/51* (2019.01); *G06F 16/9014* (2019.01)

(58) Field of Classification Search
CPC ...... G06F 16/51; G06F 16/23; G06F 16/2237; G06F 16/955; G06F 16/29; G06F 16/182; G06F 16/178; G06F 16/9577; G06F 16/9535; G06F 16/958; G06F 16/1847; G06F 16/13; G06F 16/13; G06F 16/316; G06F 11/1435
See application file for complete search history.

(56) References Cited

U.S. PATENT DOCUMENTS

| | | | | |
|---|---|---|---|---|
| 6,567,817 | B1* | 5/2003 | VanLeer | G06F 12/0871 |
| 6,961,739 | B2* | 11/2005 | Lee | G06F 16/13 |
| | | | | 707/830 |
| 7,158,999 | B2* | 1/2007 | Pace | G06F 16/10 |
| 7,444,499 | B2* | 10/2008 | Davis | G06F 9/3802 |
| | | | | 703/22 |
| 2002/0073068 | A1* | 6/2002 | Guha | G06F 16/9014 |
| 2003/0074341 | A1* | 4/2003 | Blackburn | G06F 16/9014 |
| 2005/0131961 | A1* | 6/2005 | Margolus | G06F 21/64 |
| 2005/0289133 | A1* | 12/2005 | Arrouye | G06F 16/11 |
| 2006/0059204 | A1* | 3/2006 | Borthakur | G06F 16/951 |
| 2006/0184720 | A1 | 8/2006 | Sinclair et al. | |
| 2007/0180084 | A1* | 8/2007 | Mohanty | G06F 11/1451 |
| | | | | 709/223 |
| 2007/0277227 | A1* | 11/2007 | Brendel | G06F 16/13 |
| | | | | 726/3 |
| 2010/0023726 | A1* | 1/2010 | Aviles | G06F 12/0813 |
| | | | | 711/216 |
| 2010/0057750 | A1* | 3/2010 | Aasted | G06F 9/45558 |
| | | | | 707/E17.032 |
| 2010/0083003 | A1* | 4/2010 | Spackman | H04L 9/0643 |
| | | | | 713/193 |
| 2010/0106734 | A1* | 4/2010 | Calder | G06F 16/93 |
| | | | | 707/758 |
| 2010/0174684 | A1* | 7/2010 | Schwaab | G06F 16/1756 |
| | | | | 707/655 |
| 2010/0217926 | A1* | 8/2010 | Sinclair | G06F 3/0607 |
| | | | | 711/103 |
| 2010/0332846 | A1* | 12/2010 | Bowden | G06F 16/9017 |
| | | | | 713/189 |
| 2012/0150869 | A1* | 6/2012 | Wang | G06F 3/067 |
| | | | | 707/747 |
| 2012/0311004 | A1* | 12/2012 | Nemoto | G06F 16/185 |
| | | | | 707/827 |
| 2013/0290648 | A1* | 10/2013 | Shao | G06F 3/0689 |
| | | | | 711/154 |
| 2013/0339314 | A1* | 12/2013 | Carpentier | G06F 3/0608 |
| | | | | 707/692 |
| 2014/0181119 | A1* | 6/2014 | Chiueh | G06F 16/137 |
| | | | | 707/747 |
| 2015/0215389 | A1* | 7/2015 | Spencer | H04L 67/06 |
| | | | | 707/741 |

FOREIGN PATENT DOCUMENTS

| | | |
|---|---|---|
| CN | 102629234 | 8/2012 |
| CN | 104346357 | 2/2015 |
| CN | 105550345 | 5/2016 |
| KR | 10-2007-0116792 | 12/2007 |
| WO | WO 2006/088727 | 8/2006 |
| WO | WO2008109647 A1 * | 9/2008 |
| WO | WO 2009/125027 | 10/2009 |
| WO | WO2012092213 A2 * | 7/2012 |
| WO | WO2014164016 A2 * | 10/2014 |

OTHER PUBLICATIONS

File System Implementation, <https://www.cs.odu.edu/~cs471w/spring10/lectures/FileSystemImplementation>, (XP055577253)—12 pages (Mar. 4, 2019).

* cited by examiner

METHOD AND APPARATUS FOR OPERATING ON FILE

CROSS-REFERENCE TO RELATED APPLICATION

This application claims the priority of Chinese Application No. 201510993999.9, filed on Dec. 25, 2015, the content of which is incorporated herein by reference in its entirety.

TECHNICAL FIELD

The present disclosure relates to the field of computer technology, specifically to the field of file system, and more specifically to a method and apparatus for operating on a file.

BACKGROUND

In an embedded device, an operation on a file is performed by an embedded file system. In the existing embedded file system, a log structure is generally used to store the file, that is, indexes and file data are stored in the file at the same time, and data pages of the file are non-contiguous in the storage space. When operating on the file, the approach used is to find the data page via the index, and operate the data page as a unit.

However, when the above approach is used to operate on the file, on one hand, the index occupies a large memory space, resulting in a large overhead during the file operating process, thereby increasing the system overheads of the entire embedded system. On the other hand, the data pages of the file are not contiguous in the storage space, and thus, a dynamic loading of an executable file from a third party application cannot be implemented.

SUMMARY

The present disclosure provides a method and apparatus for operating on a file to solve the technical problems mentioned in the foregoing Background section.

In a first aspect, the present disclosure provides a method for operating on a file, comprising: receiving a request of an operation on a target file, the request of the operation comprising a file name, and a data page identifier of a data page for storing the target file; acquiring index information associated with a storage space address of the data page based on the file name and the data page identifier, the index information being stored in an on-chip memory of a processor for executing a machine instruction corresponding to the operation; and finding the data page based on the index information, and performing the operation on the data page.

In a second aspect, the present disclosure provides an apparatus for operating on a file, comprising: a receiving unit, configured to receive a request of an operation on a target file, the request of the operation comprising a file name and a data page identifier of a data page for storing the target file; an acquiring unit, configured to acquire index information associated with a storage space address of the data page based on the file name and the data page identifier, the index information being stored in an on-chip memory of a processor for executing a machine instruction corresponding to the operation; and a processing unit, configured to find the data page based on the index information, and perform the operation on the data page.

The method and apparatus for operating on a file provided by the present disclosure, by receiving a request of an operation on a target file, acquire index information associated with a storage space address of a data page based on a file name and a data page identifier, the index information being stored in an on-chip memory of a processor for executing a machine instruction corresponding to the operation; and find the data page based on the index information, and perform the operation on the data page. Accordingly, the operation on the file is implemented depending on an index stored in the on-chip memory, so that memory overheads of accessing the index are equivalent to 0, and memory resources are saved, thereby reducing system overheads.

BRIEF DESCRIPTION OF THE DRAWINGS

After reading detailed descriptions of non-limiting embodiments with reference to the following accompanying drawings, other features, objectives and advantages of the present disclosure will be more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
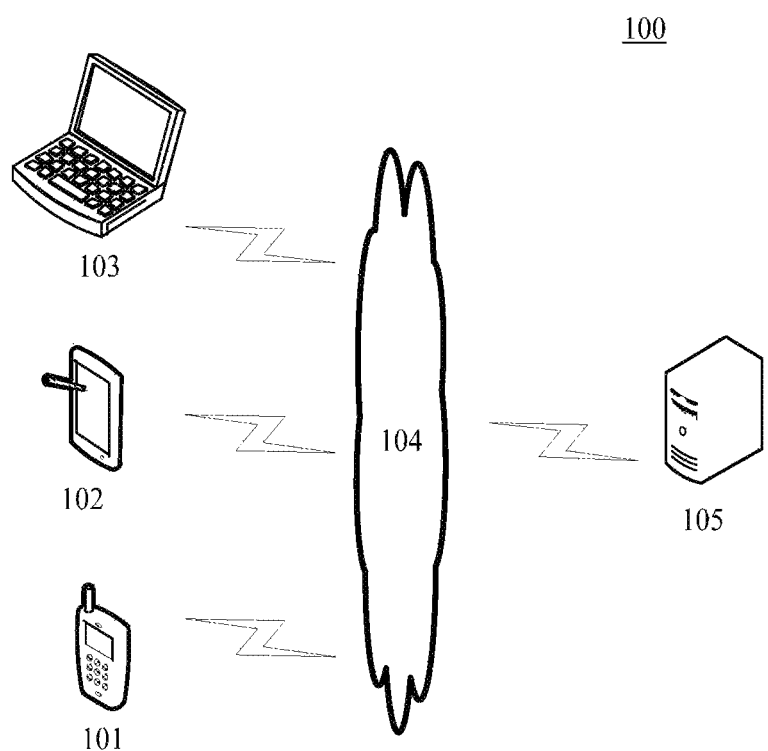
FIG. 1 is an exemplary system architecture diagram in which the present disclosure may be applied.

FIG. 1 shows an exemplary architecture of a system 100 of an embodiment in which a method and apparatus for operating on a file according to the present disclosure may be applied.

As shown in FIG. 1, the system architecture 100 may include terminal devices 101, 102 and 103, a network 104 and a server 105. The network 104 serves as a medium providing a transmission link between the terminal devices 101, 102 and 103 and the server 105. The network 104 may include various types of connections, such as wired or wireless transmission links, or optical fibers.

A user may interact with the server 105 to receive or send messages by using the terminal devices 101, 102 and 103 via the network 104. Various communication applications may be installed on the terminal devices 101, 102 and 103.

The terminal devices 101, 102 and 103 may be various electronic devices capable of possessing display screens and supporting network communication, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may be a server providing various services, for example, a cloud server providing a file storage service to the applications on the terminal devices 101, 102 and 103. The server may process a received file operation request, and feed a processed result (for example, read file data) back to the terminal devices.

It should be appreciated that the numbers of the terminal devices, the networks and the servers in FIG. 1 are merely illustrative. Any number of terminal devices, networks and servers may be provided based on the actual requirements.

Figure 2:
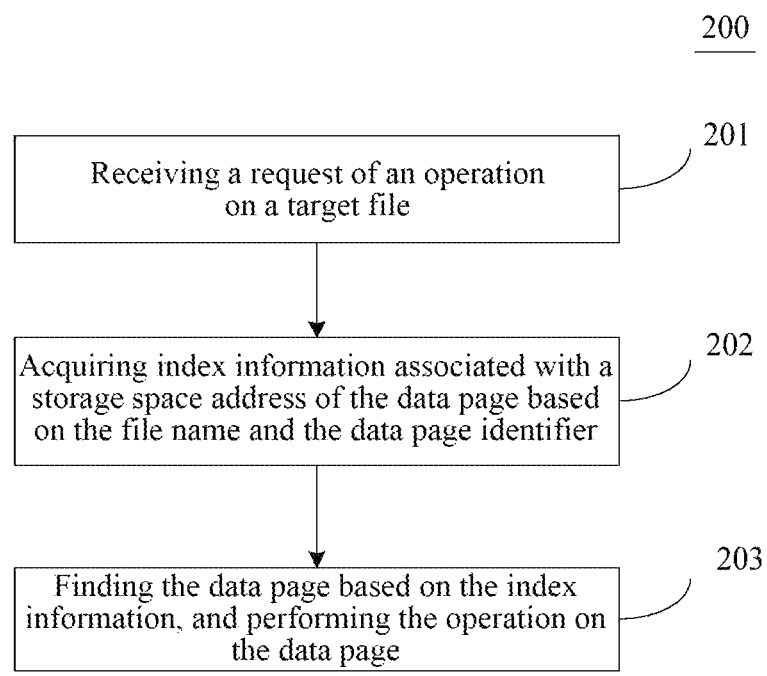
FIG. 2 is a flowchart of an embodiment according to a method of the present disclosure.

Referring to FIG. 2, which illustrates a process 200 of an embodiment according to a method for operating on a file of the present disclosure. It should be noted that the method for operating on a file provided in embodiments of the present disclosure is generally performed by the terminal devices 101, 102 and 103 or the server 105 in FIG. 1, and accordingly, an apparatus for operating on a file is generally installed on the terminal devices 101, 102 and 103 or the server 105. This method includes the following steps.

In step 201, receiving a request of an operation on a target file.

In this embodiment, an electronic device (for example, the terminal devices or servers as illustrated in FIG. 1) on which the method for operating on a file operates may receive the request of the operation on the target file by means of wired connection or wireless connection. The request of the operation includes a file name, and a data page identifier of a data page for storing the target file. In this embodiment, types of the request of the operation on the target file may be a write operation, a read operation and an update request. The target file may be stored with a data page as a unit, and accordingly, the operation on the file is also performed with a data page as a unit. For instance, when the target file is stored in a flash memory, data in one target file may be stored on a plurality of data pages (i.e., flash pages). In other words, the operation on the target file is completed by the operation on the data page storing the target file.

In step 202, acquiring index information associated with a storage space address of the data page based on the file name and the data page identifier.

In this embodiment, the index information may be stored in an on-chip memory of a processor for executing a machine instruction corresponding to the operation. For instance, when the processor executing the operation on the data page is a MCU (Microcontroller Unit), the index information may be stored in an on-chip memory (which may also be referred to as an on-board flash) of the MCU. In this embodiment, the index information may be information associated with the storage space address of the data page, for example, a physical address recording the data page in the index information.

Before describing a structure of an index in the present disclosure, problems existing when the index (which may also be referred to as a file index) is directly stored on the flash memory by simply using a one-level index will be first described. On one hand, sizes of storage spaces occupied by files are different, and numbers of the data pages occupied by the files are different, therefore, sizes of storage spaces occupied by the indexes are not fixed when correspondence between the file name and the data page is directly stored. In this way, when a data page storing the file is added or updated, the entire index will be modified. On the other hand, the storage space occupied by the index is very large, and when the data page is added, reduced or updated, the index can only be copied into the memory to be modified and then written back to the flash memory but cannot be directly modified on the flash memory, resulting in a heavy memory consumption.

In some alternative implementations of this embodiment, the index information comprises first index information including the file name and a file identifier, and second index information including the storage space address of the data page.

In this embodiment, the structure of the index may be a two-level index. A first-level index is an index from the file name to the file identifier, that is, an index that the file identifier is found by the file name. A second-level index is an index from a file name identifier and the data page identifier to the data page, that is, an index that the page data is found by the file name identifier and the data page identifier. Accordingly, for the two-level index structure, the first index information and the second index information are set. The first index information may include the file name and the file identifier, and the second index information may include the storage space address of the data page, i.e., the physical address of the data page.

In some alternative implementations of this embodiment, the method for operating on a file further includes: selecting a first data page from a storage space of the on-chip memory; creating a first hash table with the file name as a key value; storing the first index information at a location corresponding to the key value in the first hash table; and storing the first hash table into the first data page.

In this example, a data page for storing the first-level index, i.e., the first data page, may be selected from the on-chip memory. Next, the first hash table is created with the file name of the target file as the key value, and the first index information may be stored at the location corresponding to the key value, i.e., a slot, in the first hash table. After that, the first hash table is stored into the first data page. In this embodiment, there may be a plurality of first data pages for storing the first-level index, and different first data pages may be distinguished through data page identifiers, and contiguous first data pages are not necessary in the storage space.

In some alternative implementations of this embodiment, the method for operating on a file further includes: selecting a second data page from the storage space of the on-chip memory; creating a second hash table with the file identifier and the data page identifier as a key value; storing the second index information at a location corresponding to the key value in the second hash table; and storing the second hash table into the second data page.

In this example, a data page for storing the second-level index, i.e., the second data page, may be selected from the on-chip memory. Next, the second hash table is created with the file identifier and the data page identifier as the key value, and the second index information may be stored at the location corresponding to the key value, i.e., a slot, in the second hash table. After that, the second hash table is stored into the second data page. In this embodiment, there may be a plurality of second data pages storing the second-level index, different second data pages may be distinguished through data page identifiers, and contiguous second data pages are not necessary in the storage space.

Figure 3:
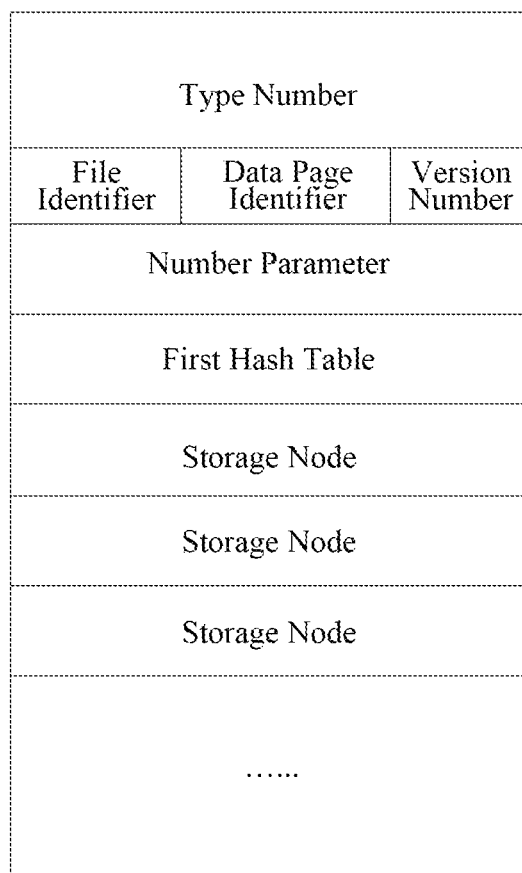
FIG. 3 is a schematic structural diagram of a data page storing a first-level index.

Referring to FIG. 3, which is a schematic structural diagram of the data page storing the first-level index. In FIG. 3, a type number (magic number) indicates a type of a file. A file identifier (fileid) indicates the file to which the data page storing the first-level index belongs, this file is a data file (which may also be referred to as an ordinary file), and a file identifier 0 may be used as the file identifier of this file. A data page identifier (pageid) indicates a sequence number of the data page in the file. A version number indicates a version of data stored on the data page. The key value of the first hash table is the file name, and a linked list may be stored on the slot of the first hash table. Each node in the linked list may correspond to one storage node (hash node). The storage node stores the first index information including the file name and the file identifier. A number parameter (count) indicates a number of used storage nodes.

Figure 4:
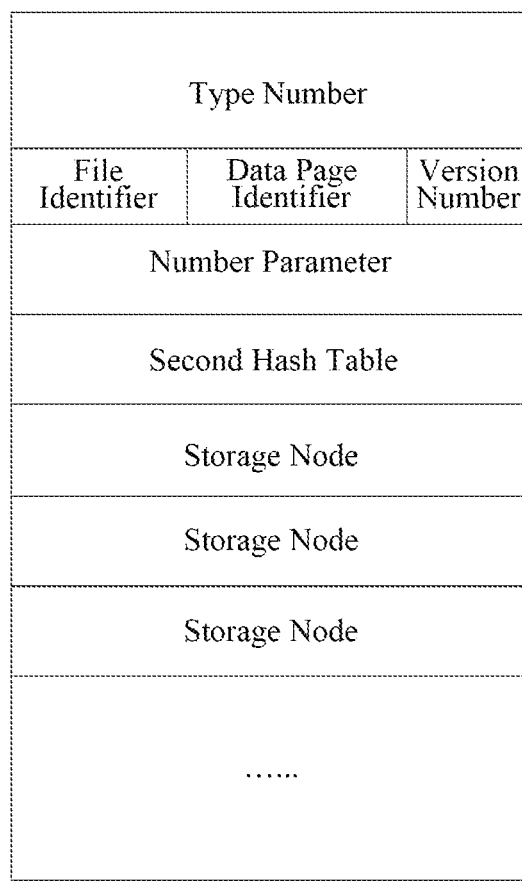
FIG. 4 is a schematic structural diagram of a data page storing a second-level index.

Referring to FIG. 4, which is a schematic structural diagram of the data page storing the second-level index. In FIG. 4, a type number (magic number) indicates a type of a file. A file identifier (fileid) indicates the file to which the data page storing the second-level index belongs, this file may be the data file, and a file identifier 1 may be used as the file identifier of this file. A data page identifier (pageid) indicates a sequence number of the data page in the file. A version number indicates a version of data stored on the data page. The key value of the second hash table is the file identifier and the data page identifier, and a storage node (hash node) may be stored on the slot of the second hash table. The storage node stores the second index information including the physical address of the data page. A number parameter (count) indicates a number of used storage nodes.

In this embodiment, when the first-level index and the second-level index are stored in the first data page and the second data page, a sum of data structures related to the first-level index and the second-level index may be referred to as a first index table and a second index table. Sizes of storage spaces occupied by storage nodes storing the first index information and the second index information may be of fixed length. For a situation where the two-level index comprises a plurality of data pages, a plurality of index tables may be adopted to indicate a respective mapping, that is, a large index table occupying a large storage space is divided into a plurality of small index tables occupying small storage spaces, and the small index tables do not need to be stored on contiguous data pages. Accordingly, the adding, reducing and updating of the data pages may be limited on a single data page storing the index to be performed, and thus, the problem of consuming a large amount of memory in the index maintaining process will be avoided.

In step 203, finding the data page based on the index information, and performing the operation on the data page.

In this embodiment, the data page may be found based on the physical address of the data page in the index information, and the operation on the data page may be performed, such as an operation of writing data into the data page, and an operation of reading data from the data page.

In some alternative implementations of this embodiment, the finding the data page based on the index information includes: acquiring the file identifier in the first index information stored at a location corresponding to the file name in the first hash table; acquiring the second index information stored at a location corresponding to the file identifier and the data page identifier in the second hash table; and finding the data page according to the storage space address of the data page in the second index information.

Figure 5:
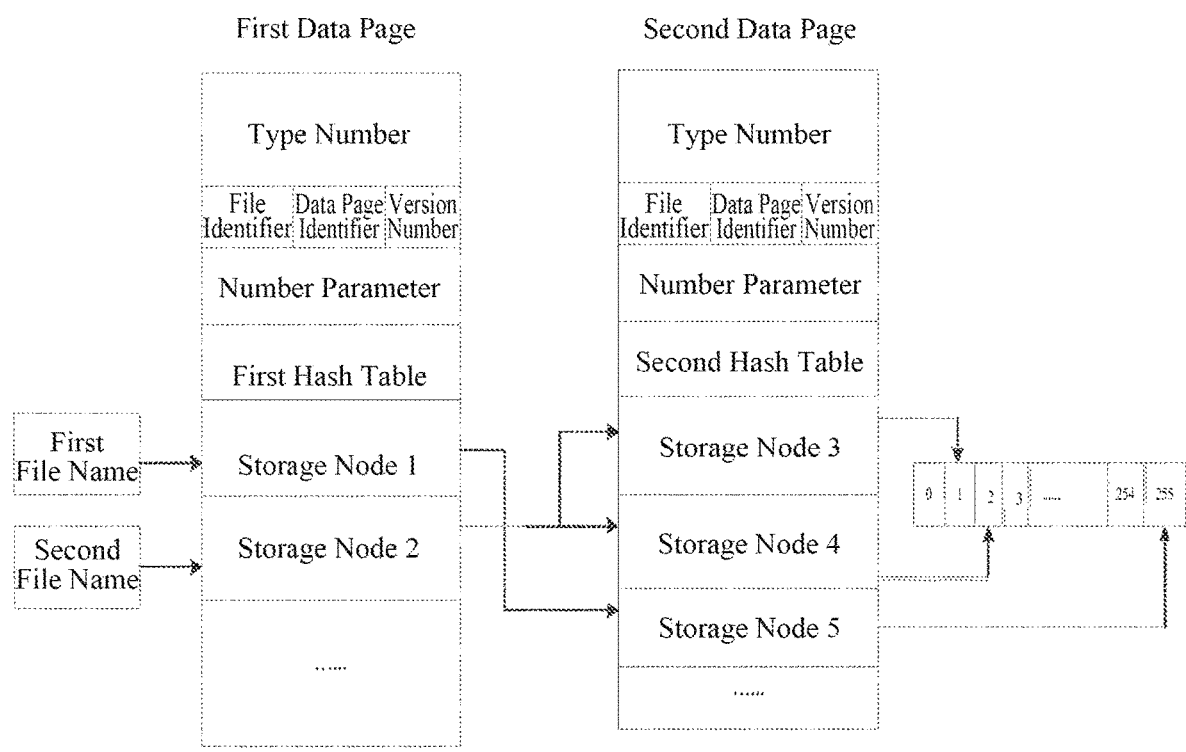
FIG. 5 is a schematic diagram of finding a data page via a two-level index.

By taking the two-level index as an example, the process of finding the data page will be described below. Referring to FIG. 5, which is a schematic diagram of finding the data page via the two-level index.

Assuming that a request of an operation on a first file includes a first file name of the first file (filename1), and a first data page identifier (pageid1). A request of an operation on a second file includes a second file name of the second file (filename2), and a second data page identifier (pageid2) and a third data page identifier (pageid3). The first data page identifier is 255. The second data page identifier and the third data page identifier are 1 and 2. Then the first file name (filename1) and the second file name (filename2) may be served as key values to calculate and obtain hash values, and linked lists stored on slots corresponding to these hash values in the first hash table are respectively acquired. Storage node 1 and storage node 2 corresponding to the first file name and the second file name in the linked lists are respectively determined. The storage node 1 stores the first index information including the first file name (filename1) and a file identifier of the first file (fileid1). The storage node 2 stores the second index information including the second file name (filename2) and a file identifier of the second file (fileid2). Accordingly, the file identifier of the first file (fileid1) and the file identifier of the second file (fileid2) will be acquired. The file identifier of the first file (fileid1) and the first data page identifier (pageid1) may be served as a key value to calculate and obtain a hash value, and storage node 5 is found on a slot corresponding to this hash value in the second hash table. The storage node 5 stores the second index information including a physical address of a data page corresponding to the first data page identifier (pageid1), and thus, the data page in the first file will be found. The second data page identifier (pageid2) and the third data page identifier (pageid3) may be served as key values respectively with the file identifier of the second file (fileid2) to calculate and obtain hash values, and storage node 3 and storage node 4 are found on slots corresponding to these hash values in the second hash table. The storage node 3 stores the second index information including a physical address of a data page corresponding to the second data page identifier (pageid2), and thus, the data page corresponding to the second data page identifier (pageid2) on the second file will be found. The storage node 4 stores the second index information including a physical address of a data page corresponding to the third data page identifier (pageid 3), and thus, the data page corresponding to the third data page identifier (pageid 3) on the second file will be found.

Differences between the index in this embodiment and the prior art are described below. In an existing embedded file system, the index occupies a larger memory space. By taking a yaffs file system that is the embedded file system as an example, assuming that the yaffs file system stores 32 files, and the size of the data page is 1 KB. The memory space to be occupied by the index is larger than 3 KB in a situation with a worst space complexity. However, in this embodiment, the index structure is directly stored on a data page in the on-chip memory. The processor can directly access the data page of the on-chip memory without the file system, and thus, in a resource-constrained embedded system, memory overhead of accessing the index are equivalent to 0, and memory resources are saved, thereby reducing system overheads of the entire embedded system.

Figure 6:
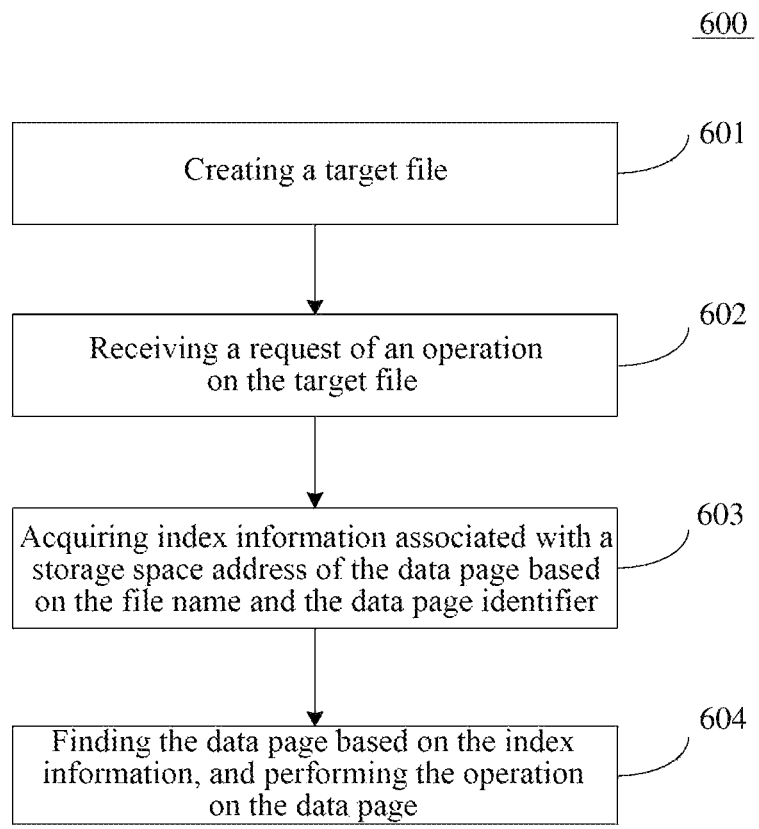
FIG. 6 is a flowchart of another embodiment according to a method for operating on a file of the present disclosure.

Referring to FIG. 6, which shows a process 600 of another embodiment according to a method for operating on a file of the present disclosure. It should be noted that, the method for operating on a file provided in embodiments of the present disclosure is generally performed by the terminal devices 101, 102 and 103 or the server 105 in FIG. 1, and this method includes the following steps.

In step 601, creating a target file.

In this embodiment, the target file may be created by allocating a file identifier corresponding to a file name; and generating first index information including the file name and the file identifier, and storing the first index information at a location corresponding to the file name in a first hash table. In this embodiment, when the target file is created, one file identifier may be first allocated for the file, and then, the file name and the file identifier are saved in a data page storing a first-level index. For instance, a hash value is first calculated and obtained for the file name, and then, an existence of an idle storage node is searched on a linked list of a slot corresponding to the hash value in a hash table in the data page storing the first-level index. If the idle storage exists, the first index information including the file name and the file identifier will be stored in this storage node. If the idle storage node does not exist, a storage node will be added to the linked list, and the first index information including the file name and the file identifier will be stored into the added storage node.

Figure 7:
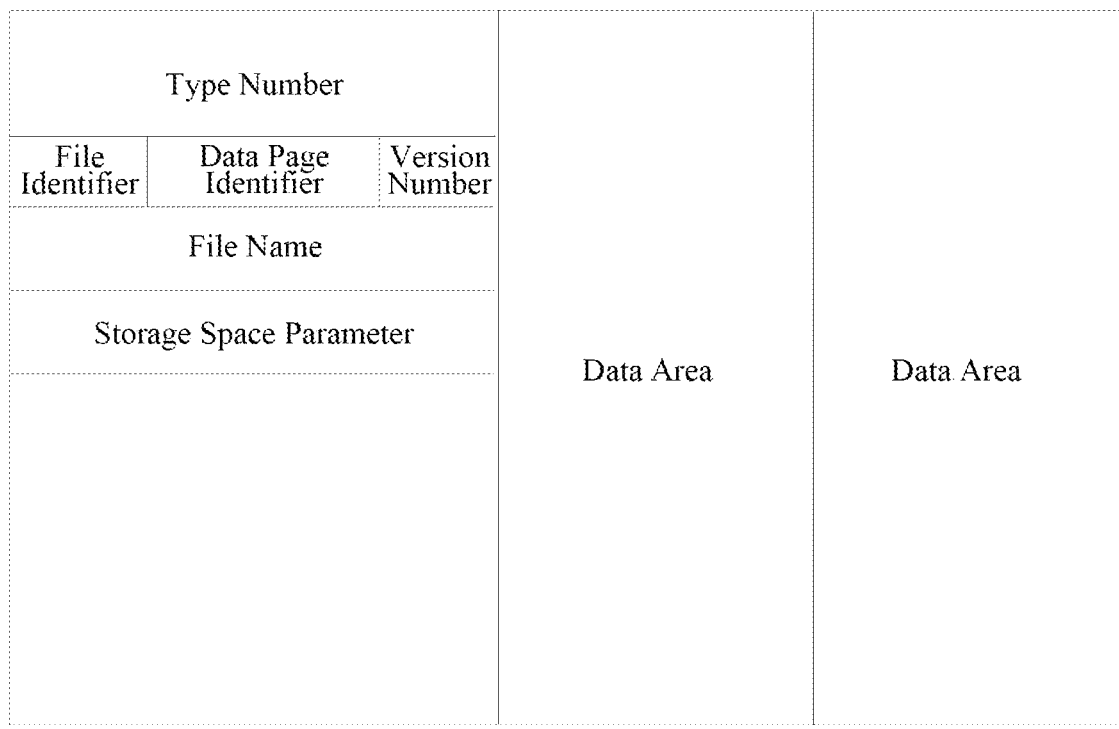
FIG. 7 is a layout of a data page of an executable file.

Referring to FIG. 7, which shows a layout of a data page of an executable file.

In this embodiment, the executable file may be stored in a storage area including a plurality of contiguous data pages. A data structure may be stored on a first data page, i.e., a data page with a data page identifier as 0, and this data structure may include a type number (magic number), a file identifier (fileid), a data page identifier (pageid), a file name and a storage space parameter (size). A numerical value of the type number indicates that a type of the file to which the data page belongs is the executable file. The file identifier indicates a file identifier of the executable file, the data page identifier is a data page identifier of the executable file, the file name is a file name of the executable file, and a file size parameter indicates a size of the executable file. A data area is used to store data of the executable file.

Figure 8:
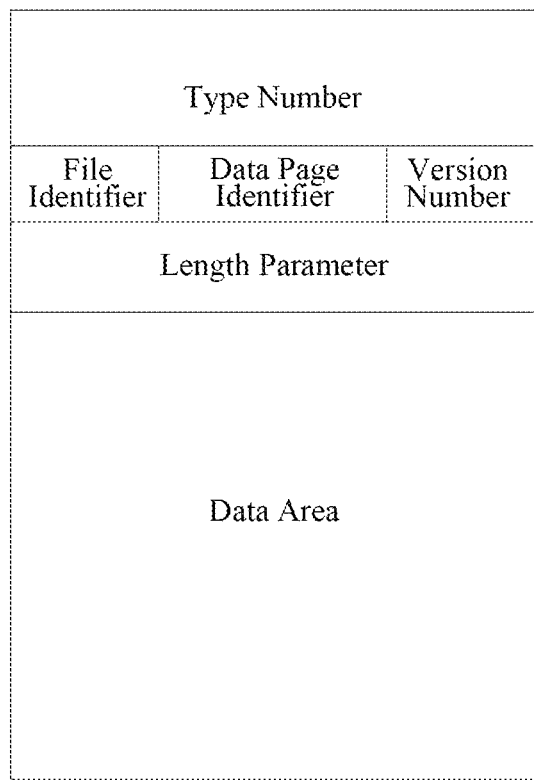
FIG. 8 is a layout of a data page of a data file.

Referring to FIG. 8, which shows a layout of a data page of a data file.

In this embodiment, the data file may include a plurality of data pages, a first data page may be served as a file header to save attribute information of the file, and the other data pages store data of the file. Each data page of the data file may include one data structure (which may also be referred to as a tag data structure), and this data structure may include a type number (magic number), a file identifier (fileid), a data page identifier (pageid), and a version number. The type number indicates that a type of the file to which the data page belongs is the data file. The file identifier is a globally unique file identifier, the data page identifier indicates a location of a current data page in the file, and the version number is a version of data stored on the data page. The version number may be used to distinguish data pages having the same file identifier and the same data page identifier, and a larger version number indicates that the data in the data page are newer data. The version number may be set to 1 when the data are written into the data page at first time. A length parameter indicates a length of valid data saved in the data page, and a data area is used to store the data of the data file.

In this embodiment, the data pages belonging to the same file may be arranged by data page identifiers from small to large. Then all the data of the file can be obtained by comparing sizes of version numbers of data pages having the same data page identifier, and removing pages with smaller version numbers.

Figure 9:
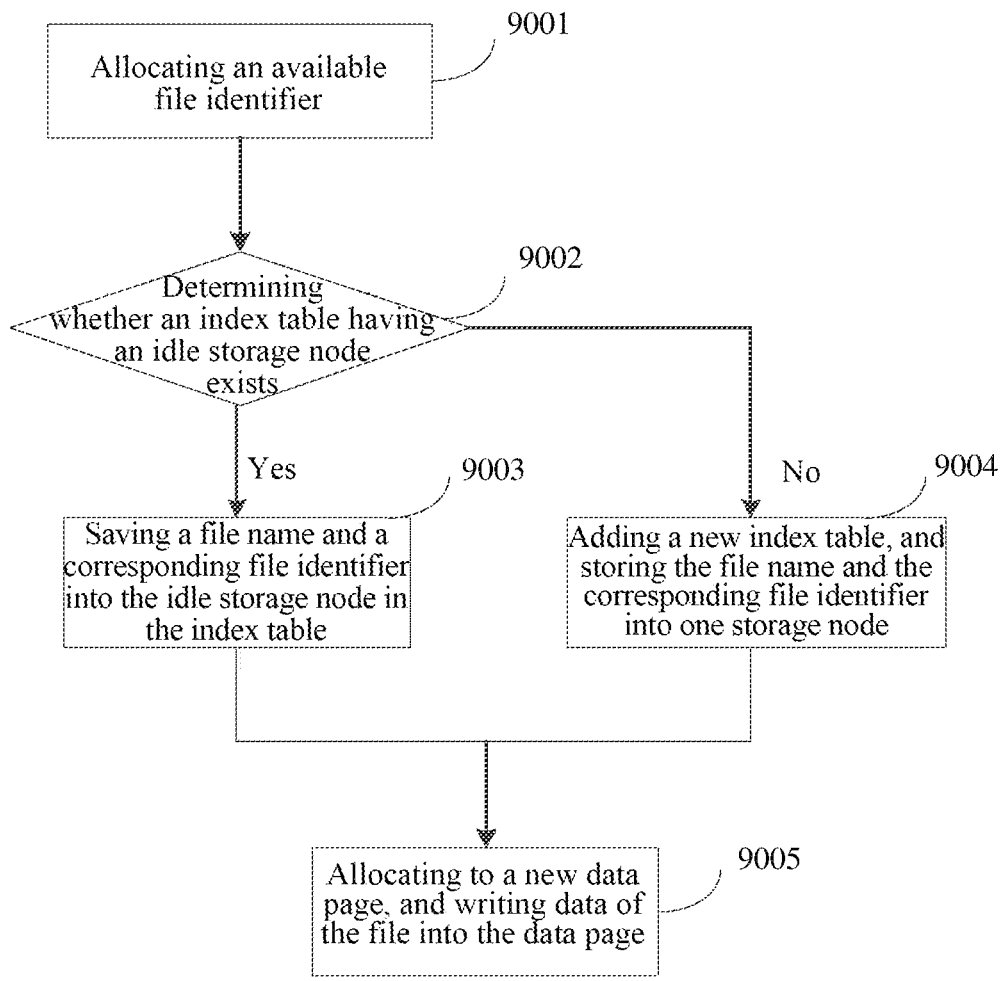
FIG. 9 is an exemplary flowchart of creating a file.

Referring to FIG. 9, which is an exemplary flowchart of creating a file. The creating includes the following steps.

In step 9001, allocating an available file identifier. The file identifier is a globally unique file identifier.

In step 9002, determining whether an index table having an idle storage node exists. When the first-level index is stored in a first data page, a sum of data structures related to the first-level index may be referred to as a first index table. The above mentioned index table is the first index table. The existence of the idle storage node in the index table may be determined. If the idle storage node exists, step 9003 is performed. If the idle storage node does not exist, step 9004 is performed.

In step 9003, saving a file name and a corresponding file identifier into the idle storage node in the index table.

In step 9004, adding a new index table, and storing the file name and the corresponding file identifier into one storage node.

In step 9005, allocating to a new data page, and writing data of the file into the data page.

In step 602, receiving a request of an operation on the target file.

In this embodiment, the request of the operation includes the file name, and a data page identifier of a data page for storing the target file. In this embodiment, a type of the request of the operation on the target file may be a write operation and a read operation. The target file may be stored with a data page as a unit, and accordingly, the operation on the file is also performed with a data page as a unit. For instance, when the target file is stored in a flash memory, data of one target file may be stored on a plurality of data pages (i.e., flash pages). In other words, the operation on the target file is completed by the operation on the data page storing the target file.

In step 603, acquiring index information associated with a storage space address of the data page based on the file name and the data page identifier.

In this embodiment, the index information is stored in an on-chip memory of a processor for executing a machine instruction corresponding to the operation. In this embodiment, the index information may be information associated with the storage space address of the data page, for example, a physical address recording the data page in the index information, and thus, the data page will be found via the index information. In this embodiment, the index information may be stored in the on-chip memory. For instance, when the processor executing the operation on the data page is a MCU, the index information may be stored in an on-chip memory (which may also be referred to as an on-board flash) of the MCU.

In this embodiment, a structure of an index may be a two-level index, and a first-level index is an index from the file name to the file identifier, i.e., an index that the file identifier is found by the file name. A second-level index is an index from a file name identifier and the data page identifier to the data page, i.e., an index that the data page is found by the file name identifier and the data page identifier. Accordingly, for the two-level index structure, first index information and second index information are set. The first index information may include the file name and the file identifier, and the second index information may include the storage space address of the data page, i.e., the physical address of the data page.

In step 604, finding the data page based on the index information, and performing an operation corresponding to an operation type identifier on the found data page.

In this embodiment, when the target file is the executable file, a write request for the executable file may be processed by determining a number of data pages for storing the executable file; allocating the number of data pages having contiguous storage space addresses and data identifiers of the data pages, and storing a storage space parameter indicating a size of the storage space of the executable file into a first data page of the data pages; generating the second index information including a storage space address of the first data page; and storing the second index information at a location corresponding to the file identifier and a data page identifier of the first data page in a second hash table.

In this embodiment, the data pages having contiguous storage space addresses and storing the executable file may be first allocated before the executable file is stored. Next, data of the executable file may be written to the data pages having contiguous addresses, and meanwhile, the file name of the executable file is stored into the first-level index, and a physical address of the first data page is stored into the second-level index. In this embodiment, the file name and the file size of the executable file may be written into the first data page storing the executable file.

In this embodiment, when the target file is the executable file, a loading request, which includes the file name and the data page identifier of the first data page, for the executable file may be processed by acquiring the file identifier in the first index information stored at the location corresponding to the file name in the first hash table; acquiring the second index information stored at the location corresponding to the file identifier and the data page identifier in the second hash table, and finding the first data page according to the storage space address of the data page in the second index information; calculating the number of data pages having contiguous storage space addresses, according to the storage space parameter stored in the first data page; and reading data in the number of data pages to load the executable file.

In this embodiment, when the executable file is loaded, the first data page may be found via the two-level index according to the file identifier of the executable file and the data page identifier of the first data page, i.e., 0. Next, the number of data pages having contiguous storage space addresses, i.e., the number of data pages of the executable file, is calculated according to the storage space parameter, i.e., a size field, stored on the first data page, and then, the above-mentioned data pages having contiguous storage space addresses are read out to implement a dynamic loading of the executable file.

In this embodiment, the write operation of the data file is divided into two kinds of operations in which one is to overwrite existing data on the data page, and the other is to write new data in an append mode. In this embodiment, an appending request for the data file may be processed by receiving an appending request for the data file, the appending request including the file name; acquiring the file identifier in the first index information stored at the location corresponding to the file name in the first hash table; allocating a data page for storing data written to the data file in an append mode, and a data page identifier of the data page; and generating the second index information including a storage space address of the data page, and storing the second index information at the location corresponding to the file identifier and the data page identifier in the second hash table. In this embodiment, when the appending request for the data file is processed, that is, when new data are written in an append mode, the data need to be written to a new allocated data page. And then, the version number is set to 1. Meanwhile, after the writing in an append mode is completed, a storage node is added into the second-level index, and the second storage information including the file identifier and a data page identifier of the new allocated data page is stored into the storage node.

In this embodiment, when an update request for the data file is processed, that is, when the existing data on the data page are overwritten, the data page may be first found, and one page of data having update data are then written into the data page, and meanwhile, the version number corresponding to the data page is added.

Figure 10:
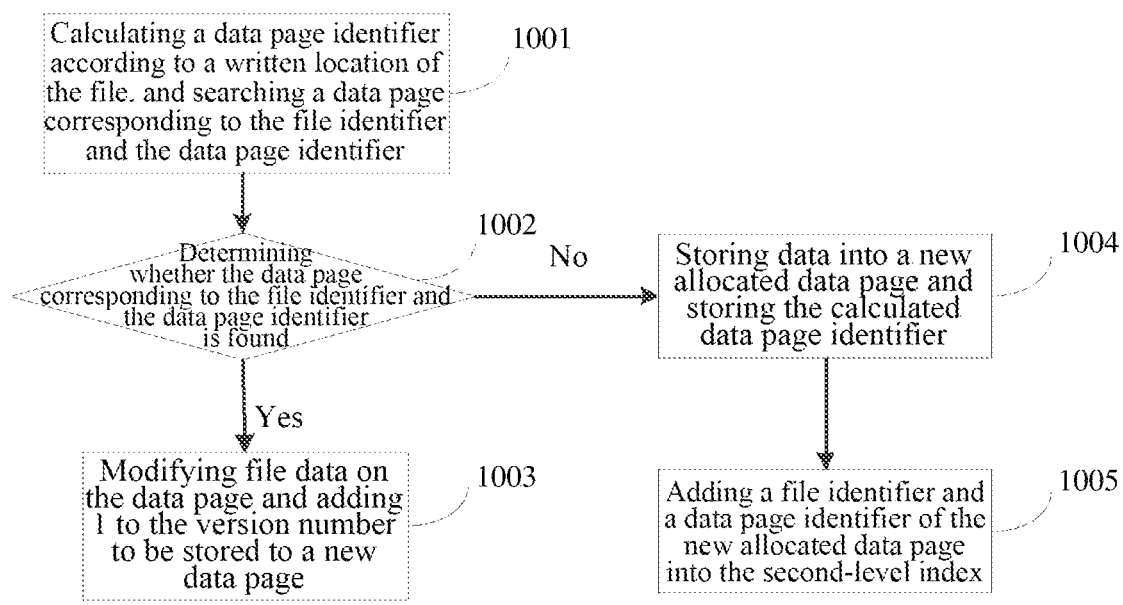
FIG. 10 is an exemplary flowchart of writing data into a data page.

Referring to FIG. 10, which shows an exemplary flowchart of writing data into a data page, comprising the following steps.

In step 1001, calculating a data page identifier according to a written location of the file, and searching a data page corresponding to the file identifier and the data page identifier. That is, the data page identifier is calculated according to the written location, and the file name and the data page corresponding to the data page identifier are searched. The written location indicates a location of to-be-written data in the whole file, and the data page identifier of the data page where the to-be-written data locate may be calculated and determined according to the written location and a size of the file. Afterwards, the data page corresponding to the file identifier and the data page identifier may be searched via the second-level index.

In step 1002, determining whether the data page corresponding to the file identifier and the data page identifier is found. If the data page is found, step 1003 will be performed, and if the data page is not found, step 1004 will be performed.

In step 1003, modifying file data on the data page, and adding 1 to the version number to be stored to a new data page.

In step 1004, storing data into a new allocated data page, and storing the calculated data page identifier. That is, a new data page is allocated, the to-be-written data is stored to the new allocated data page, and the calculated data page identifier is stored into the new data page.

In step 1005, adding a file identifier and a data page identifier of the new allocated data page into the second-level index.

As shown in FIG. 6, different from the embodiment corresponding to FIG. 2, the process 600 of the method for operating on a file in this embodiment emphasizes the step 601 of creating the target file. In step 601, the executable file is stored by pre-allocating the data pages having contiguous addresses, so that binary codes of the executable file may be stored into the data pages having contiguous addresses.

Accordingly, when the executable file is loaded, the binary codes of the executable file may be read out from the data pages having contiguous addresses, and thus the dynamic loading of the executable file from a third party application is implemented.

In the present disclosure, the operation approach described in the above embodiments may be combined with a management approach of a log-structured file system to the file to build an embedded file system. That is, the two-level index structure is built in the on-chip memory, and then, the two-level index structure may be combined with the management approach of the log-structured file system to the file, so that embedded file system will be built in the on-chip memory.

Differences between the built embedded file system and the prior art are described below.

In the existing embedded file system, the data page is stored and managed with the log structure, and the file cannot be stored on the storage spaces having contiguous addresses, that is, the addresses of the data pages in the file are non-contiguous. Therefore, the existing embedded file system is not capable of supporting the dynamic loading of the executable file, i.e., the dynamic loading of the binary codes of the executable file. Further, an embedded device using the above-mentioned embedded file system (for example, an Internet of Things device) is not capable of supporting the dynamic loading of the executable file from the third party application. However, the embedded file system built in the present disclosure, on one hand, implements an effective operation on the data page with a few of memory overheads in a storage resource constrained embedded system. On the other hand, the embedded file system built in the present disclosure supports the dynamic loading of the executable file from the third party application.

Figure 11:
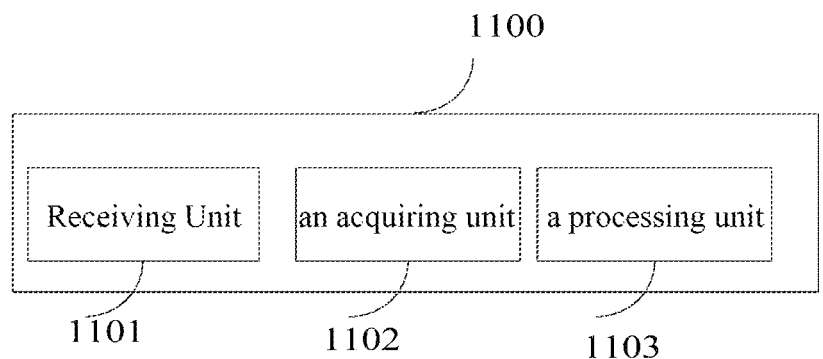
FIG. 11 is a schematic structural diagram of an embodiment according to an apparatus for operating on a file of the present disclosure.

Further referring to FIG. 11, as an implementation of the method shown in each of the above-mentioned figures, the present disclosure provides an embodiment of an apparatus for operating on a file, the embodiment of this apparatus corresponds to the embodiment of the method as illustrated in FIG. 2, and this apparatus may be applied in various electronic devices.

As shown in FIG. 11, the apparatus for operating on a file 1100 in this embodiment includes: a receiving unit 1101, an acquiring unit 1102, and a processing unit 1103. The receiving unit 1101 is configured to receive a request of an operation on a target file, the request of the operation comprising a file name and a data page identifier of a data page for storing the target file; the acquiring unit 1102 is configured to acquire index information associated with a storage space address of the data page based on the file name and the data page identifier, the index information being stored in an on-chip memory of a processor for executing a machine instruction corresponding to the operation; and the processing unit 1103 is configured to find the data page based on the index information, and perform the operation on the data page.

In this embodiment, the receiving unit 1101 may receive the request of the operation on the target file. A type of the request of the operation on the target file may be a write operation, a read operation and an update request. The target file may be stored with a data page as a unit, and accordingly, the operation on the file is also performed with a data page as a unit.

In this embodiment, the acquiring unit 1102 may acquire the index information associated with the storage space address of the data page, based on the file name and the data page identifier. The index information may be stored in the on-chip memory of the processor for executing the machine instruction corresponding to the operation. For instance, when the processor executing the operation on the data page is a MCU, the index information may be stored in an on-chip memory (which may also be referred to as an on-board flash) of the MCU. In this embodiment, the index information may be information associated with the storage space address of the data page, for example, a physical address recording the data page in the index information.

In this embodiment, the processing unit 1103 may find the data page based on the index information, for example, the physical address of the data page in the index information, and perform the operation on the data page, for example, an operation of writing data into the data page, and an operation of reading data from the data page.

In some alternative implementations of this embodiment, the index information comprises first index information including the file name and a file identifier, and second index information including the storage space address of the data page.

In some alternative implementations of this embodiment, the apparatus 1100 further includes: a first selecting unit (not shown), configured to select a first data page from a storage space of the on-chip memory; a first creating unit (not shown), configured to create a first hash table with the file name as a key value; a first index information storing unit (not shown), configured to store the first index information at a location corresponding to the key value in the first hash table; and a first hash table storing unit (not shown), configured to store the first hash table into the first data page.

In some alternative implementations of this embodiment, the apparatus 1100 further includes: a second selecting unit (not shown), configured to select a second data page from the storage space of the on-chip memory; a second creating unit (not shown), configured to create a second hash table with the file identifier and the data page identifier as a key value; a second index information storing unit (not shown), configured to store the second index information at a location corresponding to the key value in the second hash table; and a second hash table storing unit (not shown), configured to store the second hash table into the second data page.

In some alternative implementations of this embodiment, the processing unit 1103 includes: a file identifier acquiring subunit (not shown), configured to acquire the file identifier in the first index information stored at a location corresponding to the file name in the first hash table; a second index information acquiring subunit (not shown), configured to acquire the second index information stored at a location corresponding to the file identifier and the data page identifier in the second hash table; and a searching subunit (not shown), configured to find the data page according to the storage space address of the data page in the second index information.

In some alternative implementations of this embodiment, the apparatus 1100 further includes: a creation request receiving unit (not shown), configured to receive a creation request for the target file before the request of the operation on the target file is received, the creation request comprising the file name; a file identifier allocating unit (not shown), configured to allocate the file identifier corresponding to the file name; and an index information generating unit (not shown), configured to generate the first index information including the file name and the file identifier, and storing the first index information at the location corresponding to the file name in the first hash table.

In some alternative implementations of this embodiment, the apparatus 1100 further includes: a write request receiving unit (not shown), configured to receive a write request for an executable file, and determine a number of data pages for storing the executable file; a first allocating unit (not shown), configured to allocate the number of data pages having contiguous storage space addresses, and data identifiers of the data pages, and store a storage space parameter indicating a size of the storage space of the executable file into a first data page of the data pages; a second index information generating unit (not shown), configured to generate the second index information including a storage space address of the first data page; and a second index information storing unit (not shown), configured to store the second index information at a location corresponding to the file identifier and a data page identifier of the first data page in the second hash table.

In some alternative implementations of this embodiment, the apparatus 1100 further includes: a loading request receiving unit (not shown), configured to receive a loading request for the executable file, the loading request comprising the file name and the data page identifier of the first data page; a first file identifier acquiring unit (not shown), configured to acquire the file identifier in the first index information stored at the location corresponding to the file name in the first hash table; a data page searching unit (not shown), configured to acquire the second index information stored at the location corresponding to the file identifier and the data page identifier in the second hash table, and find the first data page according to the storage space address of the data page in the second index information; a calculating unit (not shown), configured to calculate the number of data pages having contiguous storage space addresses, according to the storage space parameter stored in the first data page; and a reading unit (not shown), configured to read data in the number of data pages to load the executable file.

In some alternative implementations of this embodiment, the apparatus 1100 further includes: an appending request receiving unit (not shown), configured to receive an appending request for a data file, the appending request comprising the file name; a second file identifier acquiring unit (not shown), configured to acquire the file identifier in the first index information stored at the location corresponding to the file name in the first hash table; a second allocating unit (not shown), configured to allocate a data page for storing data written to the data file in an append mode, and a data page identifier of the data page; and a second index information processing unit (not shown), configured to generate the second index information including a storage space address of the data page, and store the second index information at the location corresponding to the file identifier and the data page identifier in the second hash table.

It could be appreciated by those skilled in the art that the above-mentioned apparatus for operating on a file 1100 further includes some other common structures, such as a processor and a memory, and these common structures are not shown in FIG. 11 in order to unnecessarily blur the embodiment of the present disclosure.

FIG. is a schematic structural diagram of a computer system adapted to implement a terminal device or a server according to embodiments of the present disclosure.

Figure 12:
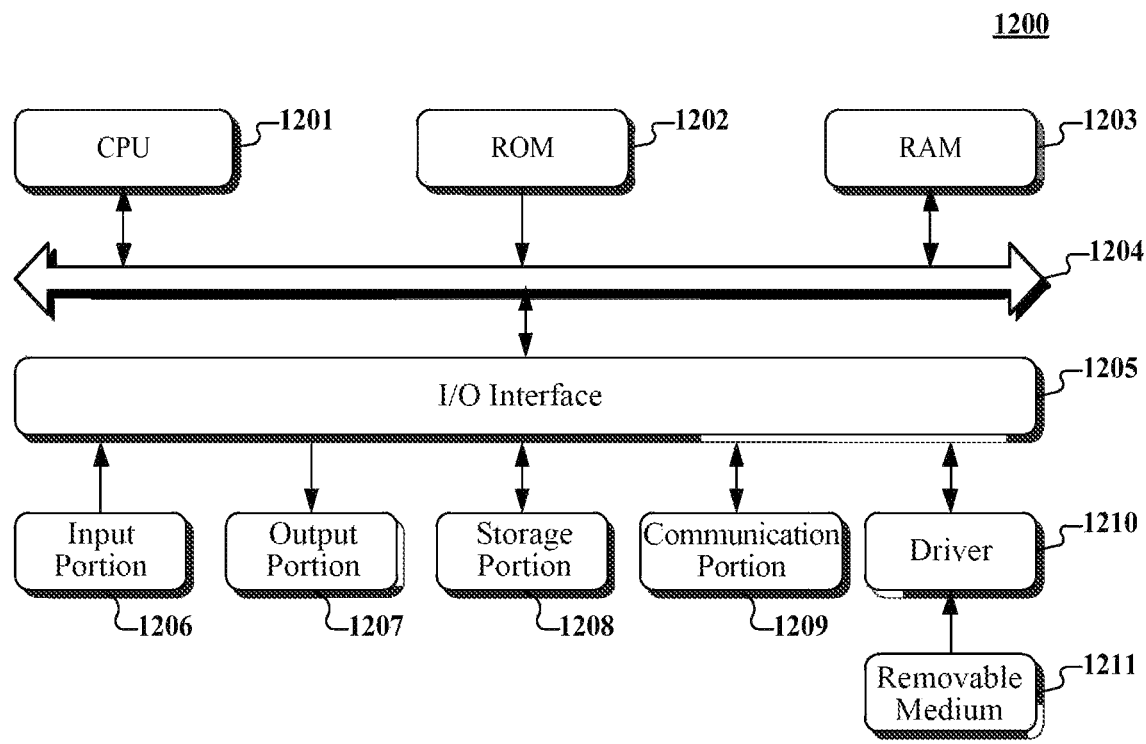
FIG. 12 is a schematic structural diagram of a computer system adapted to implement a terminal device or a server according to embodiments of the present disclosure.

As shown in FIG. 12, the computer system 1200 includes a central processing unit (CPU) 1201, which may execute various appropriate actions and processes in accordance with a program stored in a read-only memory (ROM) 1202 or a program loaded into a random access memory (RAM) 1203 from a storage portion 1208. The RAM 1203 also stores various programs and data required by operations of the system 1200. The CPU 1201, the ROM 1202 and the RAM 1203 are connected to each other through a bus 1204. An input/output (I/O) interface 1205 is also connected to the bus 1204.

The following components are connected to the I/O interface 1205: an input portion 1206 including a keyboard, a mouse etc.; an output portion 1207 comprising a cathode ray tube (CRT), a liquid crystal display device (LCD), a speaker etc.; a storage portion 1208 including a hard disk and the like; and a communication portion 1209 comprising a network interface card, such as a LAN card and a modem. The communication portion 1209 performs communication processes via a network, such as the Internet. A driver 1210 is also connected to the I/O interface 1205 as required. A removable medium 1211, such as a magnetic disk, an optical disk, a magneto-optical disk, and a semiconductor memory, may be installed on the driver 1210, to facilitate the retrieval of a computer program from the removable medium 1211, and the installation thereof on the storage portion 1208 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 1209, and/or may be installed from the removable media 1211.

The flowcharts and block diagrams in the figures illustrate architectures, functions and operations that may be implemented according to the system, the method and the computer program product of the various embodiments of the present disclosure. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

In another aspect, the present disclosure further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: receive a request of an operation on a target file, the request of the operation comprising a file name, and a data page identifier of a data page for storing the target file; acquire index information associated with a storage space address of the data page based on the file name and the data page identifier, the index information being stored in an on-chip memory of a processor for executing a machine instruction corresponding to the operation; and find the data page based on the index information, and perform the operation on the data page.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A method for operating on a file, comprising:
by at least one processor:
receiving a request of an operation on a target file, the request of the operation comprising a file name, and a data page identifier of a data page for storing the target file;
acquiring index information associated with a storage space address of the data page based on the file name and the data page identifier, the index information being stored in an on-chip memory of a processor for executing a machine instruction corresponding to the operation, wherein the index information comprises first index information including the file name and a file identifier, and second index information including the storage space address of the data page; and
finding the data page based on the index information, and performing the operation on the data page,
wherein an index corresponding to the index information is a two-level index comprising a first-level index and a second-level index, the first-level index being an index from the file name to the file identifier, the second-level index being an index from the file identifier and the data page identifier to the data page,
wherein the first index information is set for the first-level index, and the second index information is set for the second-level index,
wherein the method further comprises:
selecting a second data page from a storage space of the on-chip memory for storing the second-level index;
creating a second hash table with the file identifier and the data page identifier as a key value;
storing the second index information at a location corresponding to the key value in the second hash table; and
storing the second hash table into the second data page, and
wherein the target file comprises an executable file and the method further comprises:
receiving a loading request for the executable file, the loading request comprising the file name and a data page identifier of a first data page of data pages storing the executable file;
acquiring the file identifier in the first index information stored at a location corresponding to the file name in a first hash table;
acquiring the second index information stored at a location corresponding to the file identifier and the data page identifier of the first data page in the second hash table, and finding the first data page according to the storage space address of the first data page in the second index information;
determining, based on a storage space parameter stored in the first data page and indicating a size of the storage space of the executable file, data pages in which the executable file is stored, the data pages having contiguous storage space addresses; and
loading the executable file by reading data stored in the data pages.

2. The method according to claim 1, further comprising:
selecting a first data page from the storage space of the on-chip memory;
creating a first hash table with the file name as a key value;
storing the first index information at the location corresponding to the file name in the first hash table; and
storing the first hash table into the first data page.

3. The method according to claim 2, wherein finding the data page based on the index information comprises:
acquiring the file identifier in the first index information stored at the location corresponding to the file name in the first hash table;
acquiring the second index information stored at the location corresponding to the file identifier and the data page identifier in the second hash table; and
finding the data page according to the storage space address of the data page in the second index information.

4. The method according to claim 3, wherein before receiving the request of the operation on the target file, the method further comprises:
receiving a creation request for the target file, the creation request comprising the file name;
allocating the file identifier corresponding to the file name; and
generating the first index information including the file name and the file identifier, and storing the first index information at the location corresponding to the file name in the first hash table.

5. The method according to claim 4, wherein the method further comprises:
receiving a write request for the executable file;
allocating the data pages having contiguous storage space addresses and data identifiers of the data pages, and storing the storage space parameter indicating the size of the storage space of the executable file into the first data page;
generating the second index information including the storage space address of the first data page; and
storing the second index information at the location corresponding to the file identifier and the data page identifier of the first data page in the second hash table.

6. The method according to claim 4, wherein the target file comprises a data file, and the method further comprises:
receiving an appending request for the data file, the appending request comprising the file name;
acquiring the file identifier in the first index information stored at the location corresponding to the file name in the first hash table;
allocating a data page for storing data written to the data file in an append mode, and a data page identifier of the data page; and
generating the second index information including a storage space address of the data page, and storing the second index information at the location corresponding to the file identifier and the data page identifier in the second hash table.

7. An apparatus for operating on a file, comprising:
at least one processor; and
a memory storing instructions, which when executed by the at least one processor, cause the at least one processor to perform operations, the operations comprising:
receiving a request of an operation on a target file, the request of the operation comprising a file name, and a data page identifier of a data page for storing the target file;

acquiring index information associated with a storage space address of the data page based on the file name and the data page identifier, the index information being stored in an on-chip memory of a processor for executing a machine instruction corresponding to the operation, wherein the index information comprises first index information including the file name and a file identifier, and second index information including the storage space address of the data page; and finding the data page based on the index information, and performing the operation on the data page, wherein an index corresponding to the index information is a two-level index comprising a first-level index and a second-level index, the first-level index being an index from the file name to the file identifier, the second-level index being an index from the file identifier and the data page identifier to the data page, wherein the first index information is set for the first-level index, and the second index information is set for the second-level index, wherein the operations further comprise:
  selecting a second data page from a storage space of the on-chip memory for storing the second-level index;
  creating a second hash table with the file identifier and the data page identifier as a key value;
  storing the second index information at a location corresponding to the key value in the second hash table; and
  storing the second hash table into the second data page, and wherein the target file comprises an executable file and the operations further comprise:
  receiving a loading request for the executable file, the loading request comprising the file name and a data page identifier of a first data page of data pages storing the executable file;
  acquiring the file identifier in the first index information stored at a location corresponding to the file name in a first hash table;
  acquiring the second index information stored at a location corresponding to the file identifier and the data page identifier of the first data page in the second hash table, and finding the first data page according to the storage space address of the first data page in the second index information;
  determining, based on a storage space parameter stored in the first data page and indicating a size of the storage space of the executable file, data pages in which the executable file is stored, the data pages having contiguous storage space addresses; and
  loading the executable file by reading data stored in the data pages.

8. The apparatus according to claim 7, wherein the operations further comprise:
  selecting a first data page from the storage space of the on-chip memory;
  creating a first hash table with the file name as a key value;
  storing the first index information at the location corresponding to the file name in the first hash table; and
  storing the first hash table into the first data page.

9. The apparatus according to claim 8, wherein the finding the data page based on the index information comprises:
  acquiring the file identifier in the first index information stored at the location corresponding to the file name in the first hash table;
  acquiring the second index information stored at the location corresponding to the file identifier and the data page identifier in the second hash table; and
  finding the data page according to the storage space address of the data page in the second index information.

10. The apparatus according to claim 9, wherein the operations further comprise, before receiving the request of the operation on the target file:
  receiving a creation request for the target file, the creation request comprising the file name;
  allocating the file identifier corresponding to the file name; and
  generating the first index information including the file name and the file identifier, and storing the first index information at the location corresponding to the file name in the first hash table.

11. The apparatus according to claim 10, wherein the operations further comprise:
  receiving a write request for the executable file;
  allocating the data pages having contiguous storage space addresses and data identifiers of the data pages, and storing the storage space parameter indicating the size of the storage space of the executable file into the first data page;
  generating the second index information including the storage space address of the first data page; and
  storing the second index information at the location corresponding to the file identifier and the data page identifier of the first data page in the second hash table.

12. The apparatus according to claim 10, wherein the target file comprises a data file, the operations further comprise:
  receiving an appending request for the data file, the appending request comprising the file name;
  acquiring the file identifier in the first index information stored at the location corresponding to the file name in the first hash table;
  allocating a data page for storing data written to the data file in an append mode, and a data page identifier of the data page; and
  generating second index information including a storage space address of the data page, and storing the second index information at the location corresponding to the file identifier and the data page identifier in the second hash table.

13. A non-transitory computer storage medium storing computer readable instructions executable by a processor, the instructions, when executed by the processor, causing the processor to perform a method for operating on a file, comprising:
  receiving a request of an operation on a target file, the request of the operation comprising a file name, and a data page identifier of a data page for storing the target file;
  acquiring index information associated with a storage space address of the data page based on the file name and the data page identifier, the index information being stored in an on-chip memory of a processor for executing a machine instruction corresponding to the operation, wherein the index information comprises first index information including the file name and a file identifier, and second index information including the storage space address of the data page; and
  finding the data page based on the index information, and performing the operation on the data page, wherein an index corresponding to the index information is a two-level index comprising a first-level index and a second-level index, the first-level index being an index from the file name to the file identifier, the second-level index being an index from the file identifier and the data page identifier to the data page, wherein the first index information is set for the first-level index, and the second index information is set for the second-level index, wherein the method further comprises:
    selecting a second data page from a storage space of the on-chip memory for storing the second-level index;
    creating a second hash table with the file identifier and the data page identifier as a key value;
    storing the second index information at a location corresponding to the key value in the second hash table; and
    storing the second hash table into the second data page, and wherein the target file comprises an executable file and the method further comprises:
    receiving a loading request for the executable file, the loading request comprising the file name and a data page identifier of a first data page of data pages storing the executable file;
    acquiring the file identifier in the first index information stored at a location corresponding to the file name in a first hash table;
    acquiring the second index information stored at a location corresponding to the file identifier and the data page identifier of the first data page in the second hash table, and finding the first data page according to the storage space address of the first data page in the second index information;
    determining, based on a storage space parameter stored in the first data page and indicating a size of the storage space of the executable file, data pages in which the executable file is stored, the data pages having contiguous storage space addresses; and
    loading the executable file by reading data stored in the data pages.

* * * * *